US009307125B2

(12) United States Patent
Katsumata et al.

(10) Patent No.: US 9,307,125 B2
(45) Date of Patent: Apr. 5, 2016

(54) POSITION DETECTION DEVICE, LENS BARREL, AND IMAGING APPARATUS (71) Applicant: SONY CORPORATION, Tokyo (JP)

(72) Inventors: Soichiro Katsumata, Tokyo (JP); Takashi Koyama, Tokyo (JP); Shuhei Kaneko, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/420,950

(22) PCT Filed: Aug. 7, 2013

(86) PCT No.: PCT/JP2013/071353
§ 371 (c)(1),
(2) Date: Feb. 11, 2015

(87) PCT Pub. No.: WO2014/057726
PCT Pub. Date: Apr. 17, 2014

(65) Prior Publication Data
US 2015/0211840 A1 Jul. 30, 2015

(30) Foreign Application Priority Data
Oct. 11, 2012 (JP) ................................. 2012-226209

(51) Int. Cl.
H04N 5/225 (2006.01)
G02B 7/04 (2006.01)
G02B 7/14 (2006.01)
G02B 7/10 (2006.01)
G01D 5/347 (2006.01)
H04N 5/232 (2006.01)

(52) U.S. Cl.
CPC .............. H04N 5/2252 (2013.01); G02B 7/04 (2013.01); G02B 7/14 (2013.01); G01D 5/3473 (2013.01); G02B 7/102 (2013.01); H04N 5/23209 (2013.01)

(58) Field of Classification Search
None
See application file for complete search history.

(56) References Cited

U.S. PATENT DOCUMENTS 5,061,952 A * 10/1991 Ogawa ................... G01B 7/003
341/13
5,073,790 A * 12/1991 Ogawa ................. G01D 5/2492
396/125
5,142,314 A * 8/1992 Ogawa ................... G05B 19/23
396/87
2003/0218125 A1* 11/2003 Igaki ....................... G01D 5/38
250/231.13

(Continued)

FOREIGN PATENT DOCUMENTS

JP H07-199021 A 8/1995
JP 2004-184734 A 7/2004

(Continued)

Primary Examiner — Justin P Misleh
(74) Attorney, Agent, or Firm — Sony Corporation (57) ABSTRACT Provided is a position detection device including a detection unit configured to have a photo-reflector including a light emitter and a light receiver, the light receiver receiving light emitted from the light emitter and reflected by a reflective surface moved in a predetermined direction, the detection unit detecting a movement amount of the reflective surface based on a change in intensity of the received light, and a transparent member configured to be disposed between the reflective surface and the detection unit and to move together with the reflective surface, the transparent member being provided with a light blocking surface configured to block light and a light transmitting surface configured to transmit light, the light blocking surface and the light transmitting surface being arranged in a moving direction of the reflective surface.

15 Claims, 8 Drawing Sheets (56) References Cited

U.S. PATENT DOCUMENTS

| | | | |
|---|---|---|---|
| 2005/0023450 A1* | 2/2005 | Ito | G01D 5/34746 250/231.13 |
| 2006/0114341 A1* | 6/2006 | Morinaga | H04N 5/232 348/240.1 |
| 2010/0079740 A1* | 4/2010 | Takahashi | G03B 27/72 355/71 |
| 2010/0271711 A1* | 10/2010 | Yoshida | G01D 5/34746 359/694 |
| 2011/0109982 A1* | 5/2011 | Mitarai | G02B 7/102 359/825 |
| 2012/0097837 A1* | 4/2012 | Ohno | G01B 11/026 250/206.1 |
| 2012/0261561 A1* | 10/2012 | Horiguchi | G01D 5/262 250/231.1 |
| 2013/0015336 A1* | 1/2013 | Ohno | G01D 5/34746 250/231.1 |
| 2013/0071101 A1* | 3/2013 | Idera | G02B 7/102 396/531 |

FOREIGN PATENT DOCUMENTS

| | | |
|---|---|---|
| JP | 2006-171146 A | 6/2006 |
| JP | 2010-087564 A | 4/2010 |
| JP | 2010-237047 A | 10/2010 |
| JP | 2011-107395 A | 6/2011 |

* cited by examiner

WHEN NOT REFRACTED

WHEN REFRACTED

FIG. 9

POSITION DETECTION DEVICE, LENS BARREL, AND IMAGING APPARATUS

TECHNICAL FIELD

The present disclosure relates to a position detection device that detects the position of a moving subject by detecting the movement amount of the subject using a photo-reflector, and to a lens barrel and an imaging apparatus that are equipped with the device.

BACKGROUND ART

Generally, in a lens barrel of an imaging apparatus of various types, such as a video camera and a still camera, an optical element, such as a lens, disposed inside the lens barrel. For example, by rotationally operating an operation ring or an operation knob provided at the outer peripheral side, the lens, for example, is shifted in the optical-axis direction so that the zoom magnification can be changed or focusing can be performed. Moreover, information, such as a photographing distance and a focal length, is calculated from the positional information of, for example, the lens and is used for, for example, controlling exposure and strobe light. Therefore, proper detection of the rotation amount of the operation ring is important.

For example, in order to properly control the zoom magnification by rotating the operation ring, it is necessary to properly ascertain the rotational position of the operation ring by detecting the rotation amount of the operation ring provided at the lens barrel.

Patent Literature 1 discloses a technology for detecting the position of the operation ring by using a reflective sensor (photo-reflector) to detect a difference in intensities of light reflected by a reflective surface.

Patent Literature 2 discloses a technology for detecting the rotation amount (movement amount) by using a reflective sensor (photo-reflector) to detect a difference in intensities of light reflected by a reflective member (reflective sheet) having a reflective portion and a non-reflective portion.

CITATION LIST

Patent Literature

Patent Literature 1: JP 2011-107395A
Patent Literature 2: JP 2006-171146A

SUMMARY OF INVENTION

Technical Problem

However, the technology in Patent Literature 1 is not configured to detect the movement amount of the operation ring but is configured to detect whether the operation ring is located at a specific position based on the difference in light intensities. In the technology in Patent Literature 2, although the reflective portion and the non-reflective portion are formed on the same surface, it is not easy to form the reflective portion and the non-reflective portion on the same surface with high processing accuracy, possibly making it difficult to ensure high position detection accuracy by the reflective sensor.

Furthermore, in a lens barrel, it is desirable to ensure a stable operation state of a reflective sensor by suppressing electrostatic discharge to the reflective sensor.

An object of the present disclosure is to eliminate limitations on the shape of the reflective surface and the processing of the surface so as to achieve a position detection device in which the accuracy for detecting the movement amount is increased and an electrostatic countermeasure is taken, and also to provide a lens barrel and an imaging apparatus that are equipped with such a position detection device.

Solution to Problem

A position detection device according to the present disclosure includes a detection unit configured to have a photo-reflector including a light emitter and a light receiver, the light receiver receiving light emitted from the light emitter and reflected by a reflective surface moved in a predetermined direction, the detection unit detecting a movement amount of the reflective surface based on a change in intensity of the received light, and a transparent member configured to be disposed between the reflective surface and the detection unit and to move together with the reflective surface, the transparent member being provided with a light blocking surface configured to block light and a light transmitting surface configured to transmit light, the light blocking surface and the light transmitting surface being arranged in a moving direction of the reflective surface. A distance from the reflective surface to the photo-reflector is longer than a distance from the light blocking surface to the photo-reflector. Accordingly, in the aforementioned position detection device, the light emitted from the light emitter of the photo-reflector is blocked by the light blocking surface, whereas the transmitted light reaches the reflective surface, is reflected by the reflective surface, and returns to a light receiving surface so as to be received by the light receiving surface.

A lens barrel according to the present disclosure includes an optical element and a position detection device. The position detection device includes a detection unit configured to have a photo-reflector including a light emitter and a light receiver, the light receiver receiving light emitted from the light emitter and reflected by a reflective surface moved in a predetermined direction, the detection unit detecting a movement amount of the reflective surface based on a change in intensity of the received light, and a transparent member configured to be disposed between the reflective surface and the detection unit and to move together with the reflective surface, the transparent member being provided with a light blocking surface configured to block light and a light transmitting surface configured to transmit light, the light blocking surface and the light transmitting surface being arranged in a moving direction of the reflective surface. A distance from the reflective surface to the photo-reflector is longer than a distance from the light blocking surface to the photo-reflector. Accordingly, in the aforementioned lens barrel, the light emitted from the light emitter of the photo-reflector is blocked by the light blocking surface, whereas the transmitted light reaches the reflective surface, is reflected by the reflective surface, and returns to a light receiving surface so as to be received by the light receiving surface.

An imaging apparatus according to the present disclosure includes a lens barrel having an optical element and a position detection device. The position detection device includes a detection unit configured to have a photo-reflector including a light emitter and a light receiver, the light receiver receiving light emitted from the light emitter and reflected by a reflective surface moved in a predetermined direction, the detection unit detecting a movement amount of the reflective surface based on a change in intensity of the received light, and a transparent member configured to be disposed between the reflective surface and the detection unit and to move together with the reflective surface, the transparent member being provided with a light blocking surface configured to block light and a light transmitting surface configured to transmit light, the light blocking surface and the light transmitting surface being arranged in a moving direction of the reflective surface. A distance from the reflective surface to the photo-reflector is longer than a distance from the light blocking surface to the photo-reflector. Accordingly, in the aforementioned imaging apparatus, the light emitted from the light emitter of the photo-reflector is blocked by the light blocking surface, whereas the transmitted light reaches the reflective surface, is reflected by the reflective surface, and returns to a light receiving surface so as to be received by the light receiving surface.

Advantageous Effects of Invention

The present disclosure is advantageous in that limitations on the shape of the reflective surface and the processing of the surface can be eliminated so that a position detection device can be achieved in which the accuracy for detecting the movement amount is increased and an electrostatic countermeasure is taken, and that a lens barrel and an imaging apparatus that are equipped with such a position detection device can be provided.

DESCRIPTION OF EMBODIMENTS

The contents of the present disclosure will be described below in the following order.
1. Configuration of Imaging Apparatus
2. First Embodiment
  2.1. Configuration of Position Detection Device
  2.2. Operation of Position Detection Device
3. Second Embodiment 1. Configuration of Imaging Apparatus An imaging apparatus and a lens barrel to which the technology of the present disclosure is applied will be described below with reference to FIGS. 1, 2, and 3.

The technology of the present disclosure is applied to a still camera as an imaging apparatus to be described below, and to a lens barrel provided as an interchangeable lens of this still camera.

The applicable scope of the present technology is not limited to the still camera and the lens barrel provided as an interchangeable lens of the still camera. For example, in addition to various types of imaging apparatuses incorporated in video cameras or other devices, as well as various types of lens barrels provided in these imaging apparatuses, the present technology can be widely applied to various types of electronic devices in which position detection is performed.

Furthermore, the lens barrel is not limited to an interchangeable lens and can be widely applied to a collapsible type in which the lens barrel is disposed within the imaging apparatus when in a stowed position and is extended outward when in use. The imaging apparatus can also be widely applied to a collapsible type in which the lens barrel is disposed within the imaging apparatus when in a stowed position and is extended outward when in use.

In the description below, the front-back, up-down, and left-right directions are shown in the direction seen from the photographer at the time of imaging with the still camera. Accordingly, the imaged subject side is the front side, and the photographer side is the back side.

Also, the front-back, up-down, and right-left directions shown below are for convenience of explanation, and implementation of the present technology is not limited to these directions.

Figure 1:
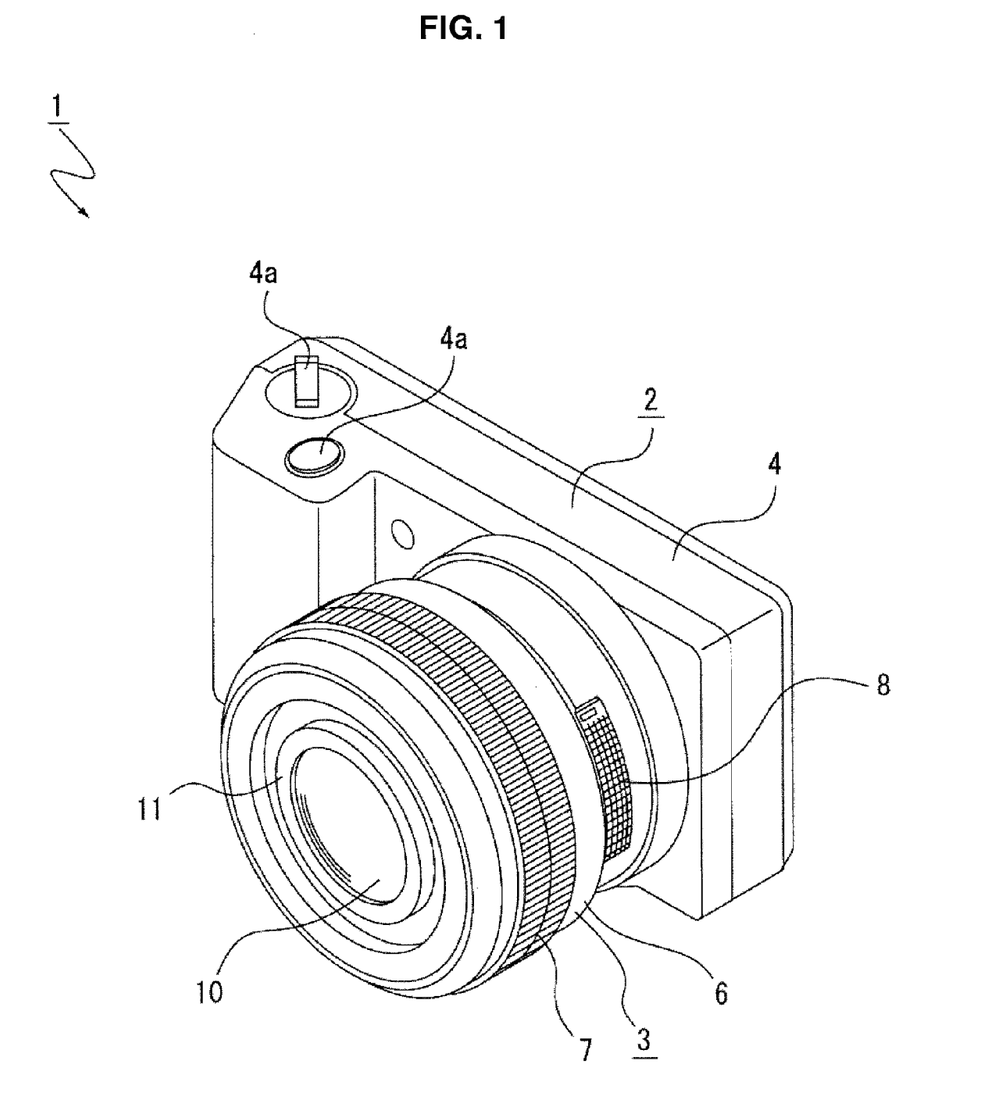
FIG. 1 is a schematic perspective view of an imaging apparatus according to an embodiment.
Figure 2:
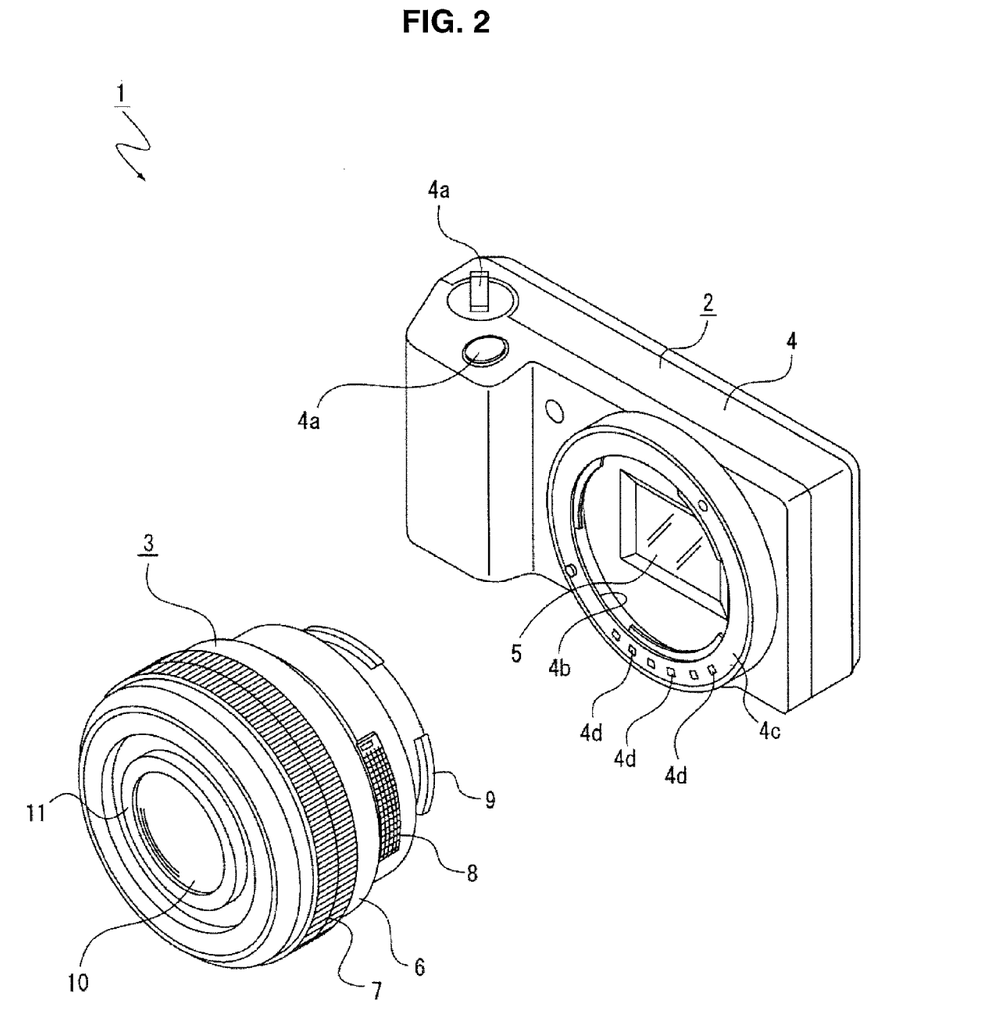
FIG. 2 is a perspective view illustrating a state where an apparatus body and a lens barrel of the imaging apparatus according to an embodiment are separated from each other.

An imaging apparatus 1 includes an apparatus body 2 and a lens barrel (interchangeable lens) 3 (see FIGS. 1 and 2). In an imaging apparatus of a collapsible type in which a lens barrel is built in the apparatus body 2 and is to be extended outward when in use, the imaging apparatus only includes the apparatus body that includes the lens barrel.

The apparatus body 2 is formed by disposing required components inside and outside a housing 4.

Various kinds of input operation sections 4a, 4a, ... are disposed at the upper surface of the housing 4. As the input operation sections 4a, 4a, ..., for example, a power button, a shutter button, and a mode switching knob are provided.

Various kinds of input operation sections and a display (which are not shown) are disposed at the rear surface of the housing 4. As the input operation sections, for example, a zoom switch and a mode switching knob are provided.

A circular opening 4b is formed in the front surface of the housing 4, and a section surrounding the opening 4b is provided as a mount section 4c for attaching the lens barrel 3. The front surface of the mount section 4c is provided with connection terminals 4d, 4d, ... arranged in the circumferential direction.

An imaging element 5, such as a charge-coupled device (CCD) or a complementary metal-oxide semiconductor (CMOS), is disposed inside the housing 4, and the imaging element 5 is located rearward of the opening 4b.

Figure 3:
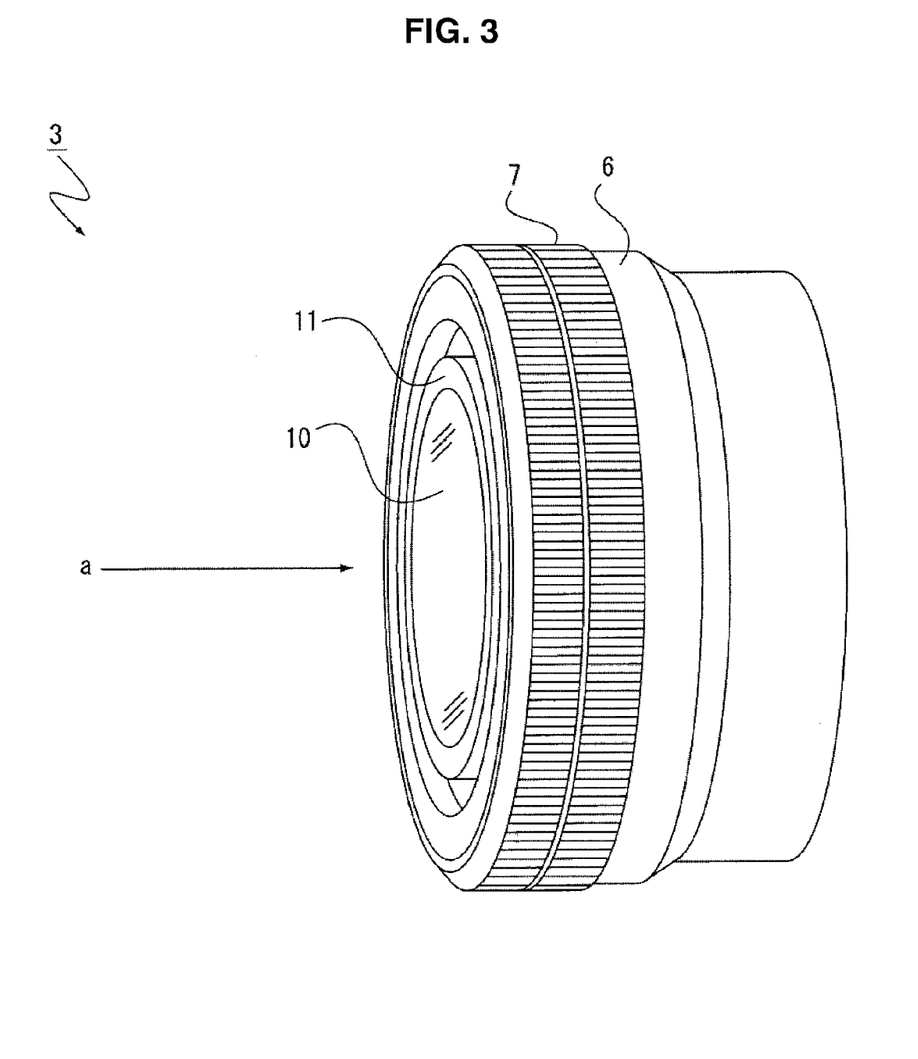
FIG. 3 is a schematic perspective view of the lens barrel according to an embodiment.

As shown in FIGS. 2 and 3, the lens barrel 3 has an outer barrel 6 and is formed by disposing required components inside and outside the outer barrel 6.

An operation ring 7 is rotatably supported by the outer periphery of the outer barrel 6. The operation ring 7 is provided as an operation section for performing zooming or focusing by being rotated. In the imaging apparatus 1, switching between the zooming operation and the focusing operation of the operation ring 7 can be performed by operating the input operation section 4a of the apparatus body 2. By detecting the movement amount of this operation ring 7 and detecting the position of the operation ring 7, operation, such as zooming, is properly performed. This operation ring 7 serves as a part of a position detection device according to the present disclosure.

A zoom lever 8 is supported by the outer peripheral surface of the outer barrel 6. The zoom lever 8 is operated in the circumferential direction relative to the outer barrel 6. When the zoom lever 8 is operated, zooming is performed at a constant rate.

A ring-shaped mount member 9 is attached to the inner peripheral surface at the rear end of the outer barrel 6. The mount member 9 is attached to the mount section 4c when the lens barrel 3 is fitted to the apparatus body 2.

Contacts (not shown) are disposed at the lower end of the mount member 9. In a state where the lens barrel 3 is fitted to the apparatus body 2, the contacts are connected to the connection terminals 4d, 4d, . . . of the apparatus body 2. With the contacts connected to the connection terminals, electrical conduction between the lens barrel 3 and the apparatus body 2 is established. The lens barrel 3 is provided with a collapsible structure having a cam ring and a plurality of movable frames, which are not shown. By operating the operation ring 7 or the zoom lever 8, the collapsible structure is extended outward from or stowed into the outer barrel 6. Therefore, when the collapsible structure is extended or stowed, lenses and a lens support frame that supports these lenses are moved together in the optical-axis direction (the front-back direction). A first lens group 10 and a lens support frame 11 that supports the first lens group 10 are disposed at an end of the lens barrel 3.

2. First Embodiment

A position detection device according to a first embodiment will be described with reference to FIGS. 4 and 5. First, the configuration of the position detection device will be described, and then the operation of the position detection device will be described.

2.1. Configuration of Position Detection Device

Figure 4:
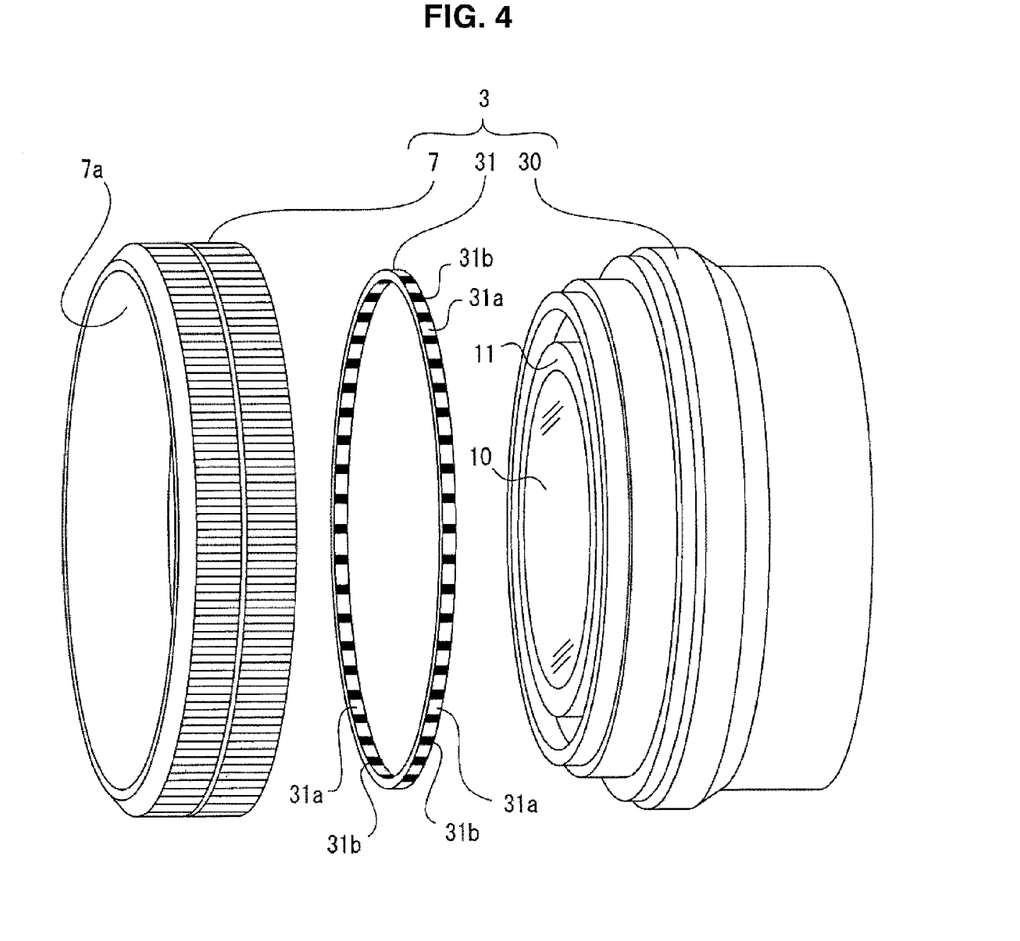
FIG. 4 schematically illustrates a disassembled state of a lens-barrel body and a position detection device according to an embodiment.
Figure 5:
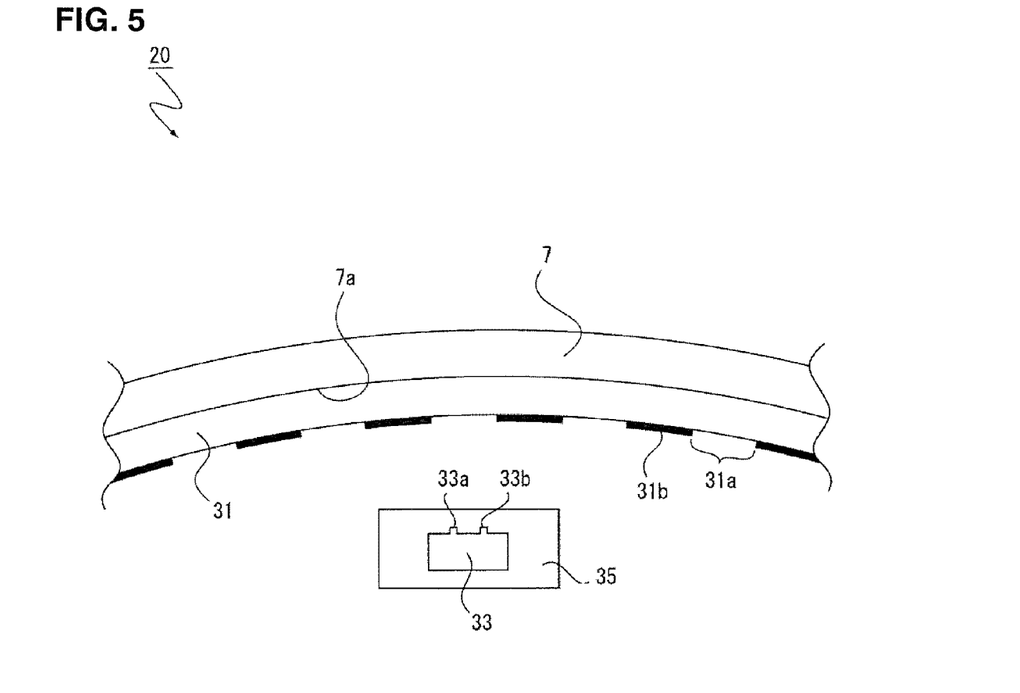
FIG. 5 schematically illustrates the configuration of the position detection device according to an embodiment.

As shown in FIGS. 4 and 5, a position detection device 20 according to this embodiment includes an operation ring 7, a transparent member 31, and a detection unit 35 including a photo-reflector 33.

FIG. 4 illustrates a disassembled state of a lens-barrel body 30, the operation ring 7, and the transparent member 31 in the lens barrel 3 according to an embodiment. The detection unit 35 (not shown in FIG. 4) is provided inside the lens-barrel body 30.

FIG. 5 schematically illustrates the configuration of the position detection device 20 when the lens barrel 3 is viewed in a direction of an arrow a in FIG. 3. As shown in FIG. 5, the operation ring 7 is disposed at the outer periphery of the lens barrel 3, and the transparent member 31 is disposed within the operation ring 7. The transparent member 31 is joined to the operation ring 7 by, for example, a transparent adhesive. The operation ring 7 serves as a movable section that rotates (moves) in the circumferential direction, and the transparent member 31 also rotates together with the rotation of the operation ring 7. The detection unit 35 is disposed within the transparent member 31.

As already described above, the operation ring 7 is to be rotationally operated for performing zooming or focusing in the imaging apparatus. In accordance with this rotation amount, the lenses inside the lens barrel 3 shift in the optical-axis direction, so that zooming or focusing becomes possible.

The movement amount of this operation ring 7 is a target to be detected by the detection unit 35. Specifically, the detection unit 35 detects the movement amount of the operation ring 7 so as to detect the rotational position of the operation ring 7.

The inner peripheral surface of the operation ring 7 serves as a reflective surface 7a. The reflective surface 7a reflects light emitted from the photo-reflector 33. Because the operation ring 7 is normally made of metal, the surface of the operation ring 7 that is in contact with the transparent member 31 forms a metallic reflective surface 7a. By forming the operation ring 7 using metal, the strength of the operation ring 7 can be increased, and the reflectivity of the operation ring 7 can also be increased.

However, the operation ring 7 is not limited to metal and may be made of other materials, such as resin. In that case, the reflective surface 7a can be formed by depositing metal over the surface of the operation ring 7 that is to come into contact with the transparent member 31. For example, an aluminum deposition technique is widely known.

The reflective surface 7a is basically made of metal, but is not limited to metal. The surface of the operation ring 7 that is to come into contact with the transparent member 31 may be coated with another material so long as the material reflects light.

The transparent member 31 is formed in a ring shape. The transparent member 31 is disposed between the operation ring 7 and the detection unit 35 and is configured to transmit or block light emitted from the detection unit 35. A plurality of light blocking surfaces 31b are formed on the inner peripheral surface of the transparent member 31. By forming the light blocking surfaces 31b, regions other than the light blocking surfaces 31b are formed as light transmitting surfaces 31a. Therefore, the light transmitting surfaces 31a and the light blocking surfaces 31b are formed so as to be alternately arranged at equal pitch in the circumferential direction. The light blocking surfaces 31b block the light emitted from the detection unit 35, whereas the light transmitting surfaces 31a allow the light to reach the reflective surface 7a. Then, the light is reflected by the reflective surface 7a, and the reflected light is received by the detection unit 35. By monitoring this reflected light, the movement amount of the operation ring 7 can be detected.

The light blocking surfaces 31b can be formed by printing ink having a high light blocking rate. In this case, the manufacturing cost can be reduced. Alternatively, the light blocking surfaces 31b can be formed by applying a coating having a high light blocking rate. In this case, the manufacturing process is simplified. As another alternative, the light blocking surfaces 31b can be formed by bonding a seal having a high light blocking rate. In this case, the manufacturing process is also simplified.

The material of the transparent member 31 is, for example, glass or resin and is an insulator. Therefore, the operation ring 7 and the detection unit 35 are electrically insulated from each other. Thus, electrostatic discharge from the outside is prevented with respect to the detection unit 35. Hence, excellent electrostatic resistance is achieved.

The light blocking surfaces 31b are desirably formed on the surface of the transparent member 31 at the detection unit 35 side, that is, the inner peripheral surface. However, the position where the light blocking surfaces 31b are formed is not limited to this position and may be any position of the transparent member 31 so long as the distance from the reflective surface 7a to the photo-reflector 33 in the detection unit 35 is longer than the distance from the photo-reflector 33 to the light blocking surfaces 31b. For example, the light blocking surfaces 31b may be formed inside the transparent member 31. This is because, by making the distance from the reflective surface 7a to the photo-reflector 33 longer than the distance from the light blocking surfaces 31b to the photo-reflector 33, the detection accuracy of the detection unit 35 improves in accordance with the characteristics of the photo-reflector 33.

The detection unit 35 has the photo-reflector 33 that includes a light emitter 33a and a light receiver 33b. Light is emitted from the light emitter 33a of the photo-reflector 33, and reflected light from a subject is received by the light receiver 33b. By measuring the light intensity of the reflected light, the movement amount of the subject is detected. The received light is converted into an electric signal. The detection unit 35 may be configured to directly output this electric signal outside, or may include an amplifier so as to amplify the electric signal before outputting the electric signal. Furthermore, an analog-to-digital converter that converts the electric signal into a digital signal may be included. In order to reduce the size of the detection unit 35 as much as possible, the detection unit 35 preferably includes the photo-reflector 33 alone.

Figure 6:
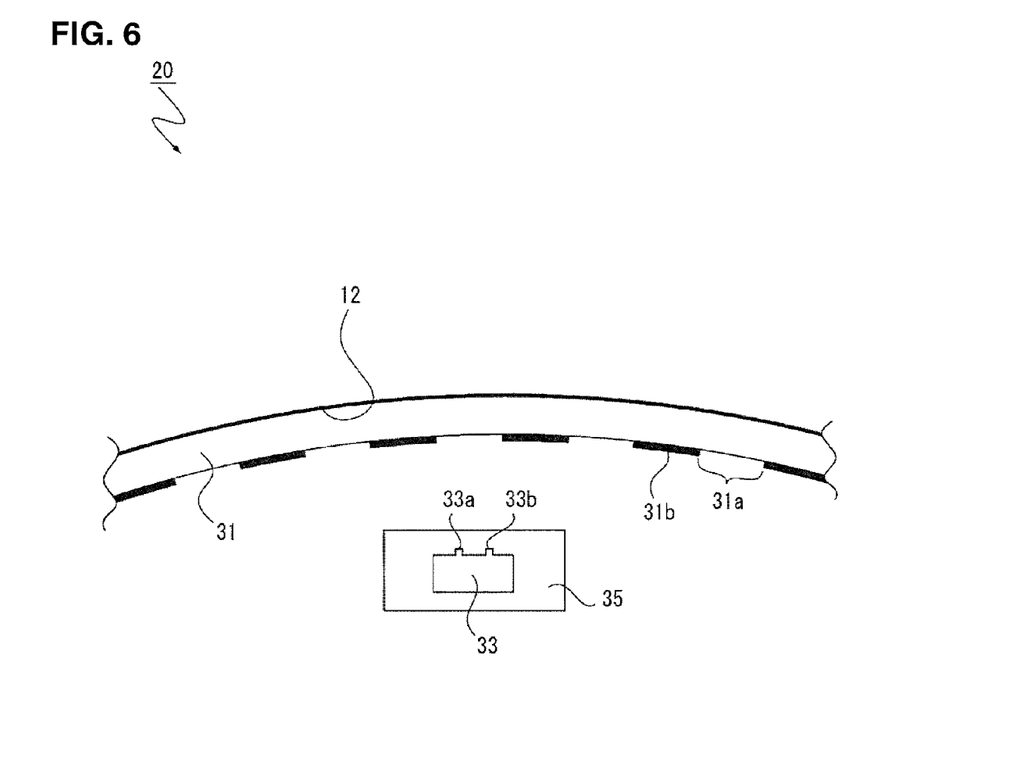
FIG. 6 schematically illustrates the configuration of the position detection device in a case where a movable section includes a transparent member alone.

As described above, the position detection device 20 includes the operation ring 7, the transparent member 31, and the detection unit 35. Although the operation ring 7 and the transparent member 31 are provided as separate components here, the operation ring 7 may be omitted and the transparent member 31 alone may be provided such that the light blocking surfaces 31b and a reflective surface 12 are respectively formed on opposite surfaces of the transparent member 31, as shown in FIG. 6. In this case, the transparent member 31 is to be operated. In the case where the reflective surface 12 is formed on the outer peripheral surface of the transparent member 31 in this manner, the operation ring 7 can be omitted. In this case, the lens barrel can be reduced in size since the operation ring is not provided.

The reflective surface 12 can be formed on the transparent member 31 by, for example, depositing metal.

Furthermore, in this embodiment, the position detection device 20 is assumed to be used for controlling zooming or focusing in the lens barrel 3 of the imaging apparatus 1. Therefore, the operation ring 7 and the transparent member 31 are formed in a ring shape and are rotatable. However, the position detection device according to the present disclosure does not have to be ring-shaped and is not limited in shape. For example, the position detection device according to the present disclosure may be configured to detect a linearly-operated movable section.

As described above, according to the present disclosure, the rotation detection accuracy can be improved, and an electrostatic countermeasure effect can be achieved.

Furthermore, since the reflective surface 7a is formed on the operation ring 7 that is operated so as to rotate together with the transparent member 31, the operation ring 7a can be readily formed at the outer peripheral side of the light transmitting surfaces 31a and the light blocking surfaces 31b, and a dedicated component for forming the reflective surface 7a is not necessary. A reduced number of components as well as reduced manufacturing cost can be achieved.

Furthermore, since the transparent member 31 in the lens barrel 3 is formed in a circular shape and is rotatable, and the detection unit 35 is disposed within the transparent member 31, the detection unit 35 is not disposed outside the transparent member 31 so that the detection unit 35 is prevented from protruding outward, whereby the lens barrel 3 can be reduced in size.

Furthermore, since the ring-shaped operation ring 7 is attached to the outer peripheral surface of the transparent member 31, the operation ring 7 and the transparent member 31 joined together have a small outer shape, so that the lens barrel 3 can be reduced in size.

2.2. Operation of Position Detection Device

The operation of the position detection device 20 according to the present disclosure when detecting the position of a subject by calculating the movement amount of the subject will be briefly described.

Light emitted from the light emitter 33a of the photo-reflector 33 is blocked by a light blocking surface 31b, but is transmitted through a light transmitting surface 31a and reaches the reflective surface 7a, and the light is reflected by the reflective surface 7a. Then, the light reflected by the reflective surface 7a is detected by the light receiver 33b. When the operation ring 7 and the transparent member 31 are rotated together, the intensity of the light received by the light receiver 33b changes every time the light is blocked by a light blocking surface 31b. By counting this, the number of light blocking surfaces 31b that the light emitted from the light emitter 33a has passed can be determined. Thus, based on the pitch of the light blocking surfaces 31b and the light transmitting surfaces 31a, the amount by which the operation ring 7 has moved can be detected. By detecting the movement amount of the operation ring 7, the rotational position of the operation ring 7 can be detected.

Next, the appearance pattern of the light blocking surfaces 31 of the transparent member 31 will be described with reference to FIG. 7.

Figure 7:
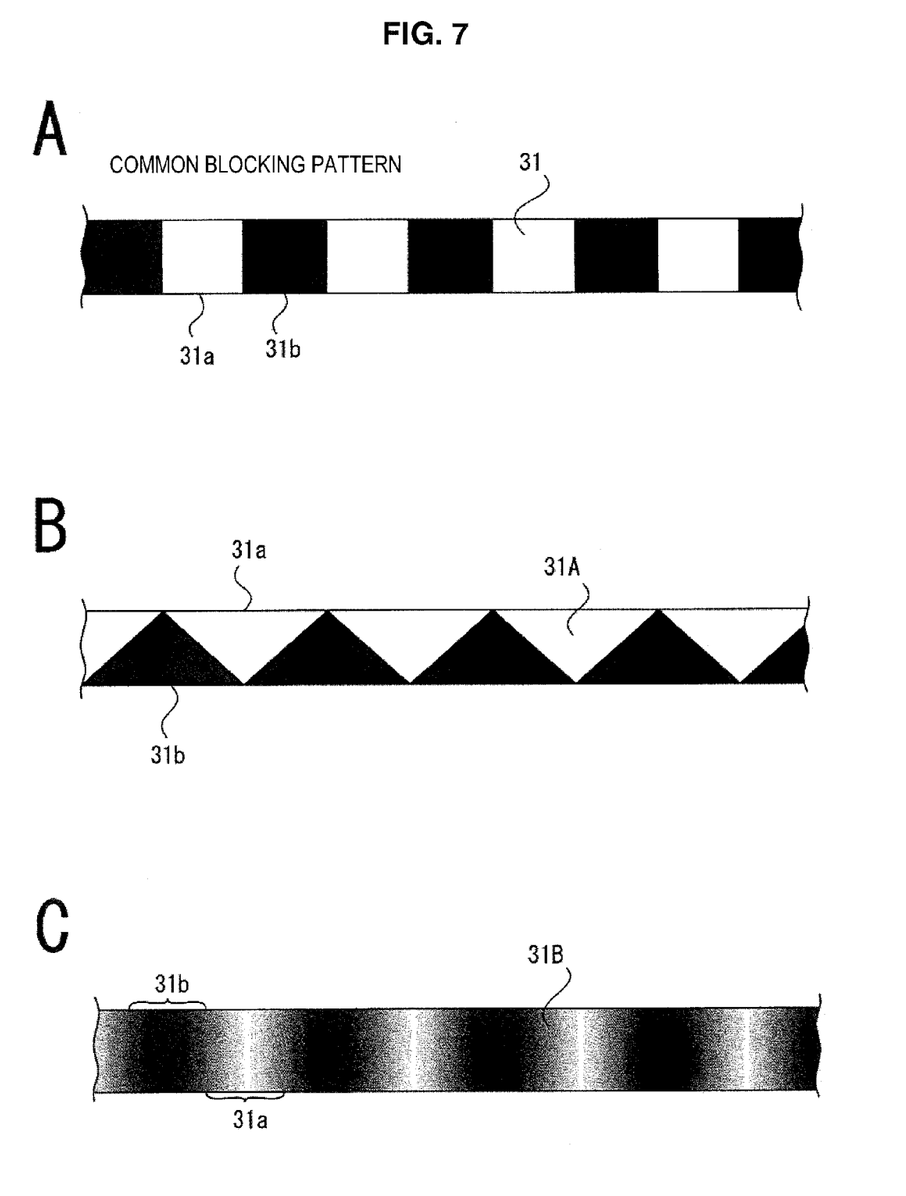
FIG. 7 illustrates patterns of shapes of light blocking surfaces according to an embodiment.

FIG. 7 illustrates patterns of the light blocking surfaces 31b and the light transmitting surfaces 31a formed on the transparent member 31, and includes diagrams of the transparent member 31 as viewed from the direction of the detection unit 35.

FIG. 7A illustrates the transparent member 31 having the most common pattern. The transparent member 31 has the light blocking surfaces 31b formed at equal pitch, and the light blocking surfaces 31b each have a rectangular shape. In the case of this pattern, the movement amount can be detected by counting the number of light blocking surfaces 31b that the light emitted from the light emitter 33a has passed. By increasing the number of light blocking surfaces 31b, the detection accuracy is improved. However, even if the number were increased, the movement amount cannot be determined unless the intensity of the light received by the photo-reflector 33 is accurately detected. Therefore, due to the relationship with the performance of the photo-reflector 33, the detection accuracy cannot be increased by simply increasing the number of light blocking surfaces 31b. In other words, there is an upper limit to the number of light blocking surfaces 31b. In the position detection device according to the present disclosure, high resolution is achieved since the distance from the reflective surface 7a to the photo-reflector 33 is longer than the distance from the light blocking surfaces 31b to the photo-reflector 33, so that the number of light blocking surfaces 31b can be increased relative to the related art, whereby the movement amount can be detected with high accuracy.

FIG. 7B illustrates a transparent member 31A provided with triangularly-formed light blocking surfaces 31b and triangularly-formed light transmitting surfaces 31a that are arranged in an alternately-inverted manner. Thus, the light blocking rate of the light blocking surfaces 31b changes continuously and linearly in the rotational direction of the operation ring 7, and the intensity of the light reflected by the reflective surface 7a and received by the light receiver 33b changes continuously and linearly in the moving direction of the operation ring 7. This causes the light intensity (voltage value) to be a maximum value at a position intersecting with the apex of each light blocking surface 31b and to be a minimum value at a position intersecting with the apex of each light transmitting surface 31a. Furthermore, the light intensity decreases linearly from the position intersecting with the apex of each light blocking surface 31b to the position intersecting with the apex of each light transmitting surface 31a. Moreover, the light intensity increases linearly from the position intersecting with the apex of each light transmitting surface 31a to the position intersecting with the apex of each light blocking surface 31b. Therefore, by properly measuring the change in the light intensity, the movement amount can be properly detected. Although an error that resembles a quantization error in principle occurs in the case of FIG. 7A, this can be eliminated in this pattern, so that more highly-accurate detection is possible.

FIG. 7C has the same concept as the pattern shown in FIG. 7B and illustrates a transparent member 31 in which the light blocking surfaces 31b and the light transmitting surfaces 31a are given gradation such that the light blocking rate of the light blocking surfaces 31b changes continuously in the moving direction. The light blocking rate of the light blocking surfaces 31 changes continuously and linearly in the rotational direction of the operation ring 7, and the intensity of the light reflected by the reflective surface 7a and received by the light receiver 33b changes continuously in the moving direction of the operation ring 7. Similar to the case of FIG. 7B, an error that resembles a quantization error can be eliminated, so that more highly-accurate detection is possible.

Figure 8:
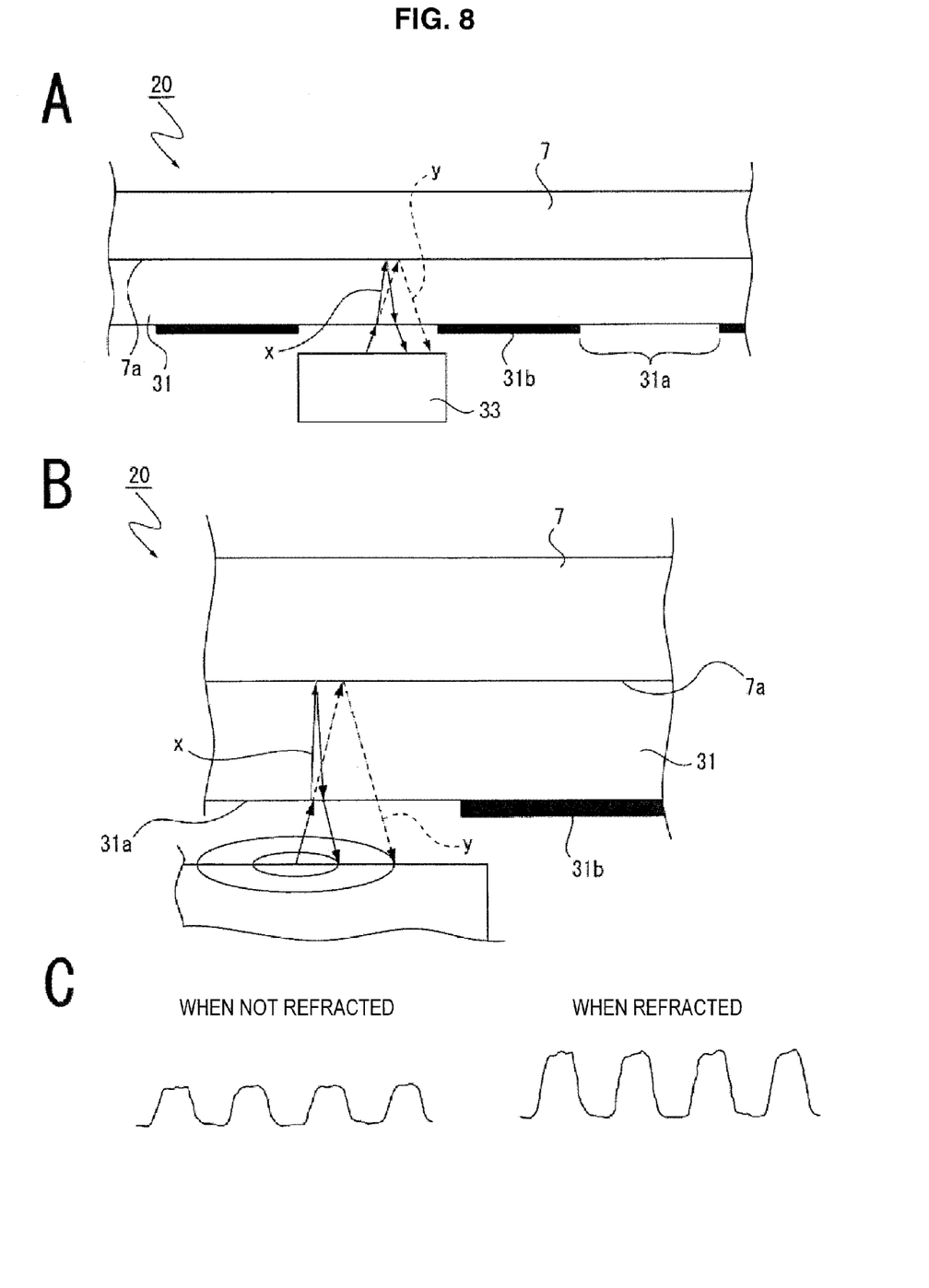
FIG. 8 illustrates the function of the transparent member according to an embodiment.

Next, an improvement in detection accuracy owing to refraction of light by the existence of the transparent member 31 will be described with reference to FIG. 8.

FIG. 8A illustrates a light traveling state when the light emitted from the photo-reflector 33 reaches the reflective surface 7a via the transparent member 31, is reflected by the reflective surface 7a, and returns to the photo-reflector 33. A light traveling state when the light is refracted by the transparent member 31 (solid line x) and a light traveling state when it is assumed that the light is not refracted (dotted line y) are shown.

When the light is to be refracted by the transparent member 31, the light emitted from the photo-reflector 33 is refracted upon entering the transparent member 31 (solid line x). Then, the refracted light reaches the reflective surface 7a. The light reflected by the reflective surface 7a is output from the transparent member 31, is refracted, and returns to the photo-reflector 33. The light traveling state in this case is indicated by an arrow x shown at the left side in FIG. 8A.

On the other hand, when it is assumed that the light is not to be refracted, the light emitted from the photo-reflector 33 travels straight so as to reach the reflective surface 7a (dotted line y). Then, the light reflected by the reflective surface 7a travels straight so as to return to the photo-reflector 33. The light traveling state in this case is indicated by an arrow y shown at the right side in FIG. 8A. FIG. 8B is an enlarged view illustrating the aforementioned two light traveling states.

When the aforementioned two light traveling states are compared, the light returning to the photo-reflector 33 is in a diffused state in the case where the light is not refracted (i.e., in the case where there is no transparent member 31). This implies that a received optical signal level has decreased, as compared with the case where the light is refracted. In other words, the signal-to-noise (S/N) ratio deteriorates.

In the case where the light is refracted owing to the existence of the transparent member 31, the light returning to the photo-reflector 33 is in a condensed state. This implies that a decrease in the received optical signal level is prevented, so that the S/N ratio is improved.

FIG. 8C illustrates the magnitude of signals of received optical signal levels. As shown in FIG. 8C, the optical signal level has decreased when there is no transparent member 31 and the light is not refracted (left side in FIG. 8C). When the transparent member 31 exists and the light is refracted (right side in FIG. 8C), a high signal level is ensured without a decrease in the optical signal level.

Accordingly, with the existence of the transparent member 31, the light is condensed at the light receiver 33b of the photo-reflector 33, the received optical signal level becomes higher, the S/N ratio is improved, and highly accurate detection becomes possible. Thus, the movement amount can be detected with high resolution, whereby more detailed position detection becomes possible.

The reason that light is refracted upon entering or exiting the transparent member 31 is because the refractive index of the transparent member 31 is larger than that of air. Therefore, the transparent member 31 is preferably made of glass or resin.

3. Second Embodiment

Figure 9:
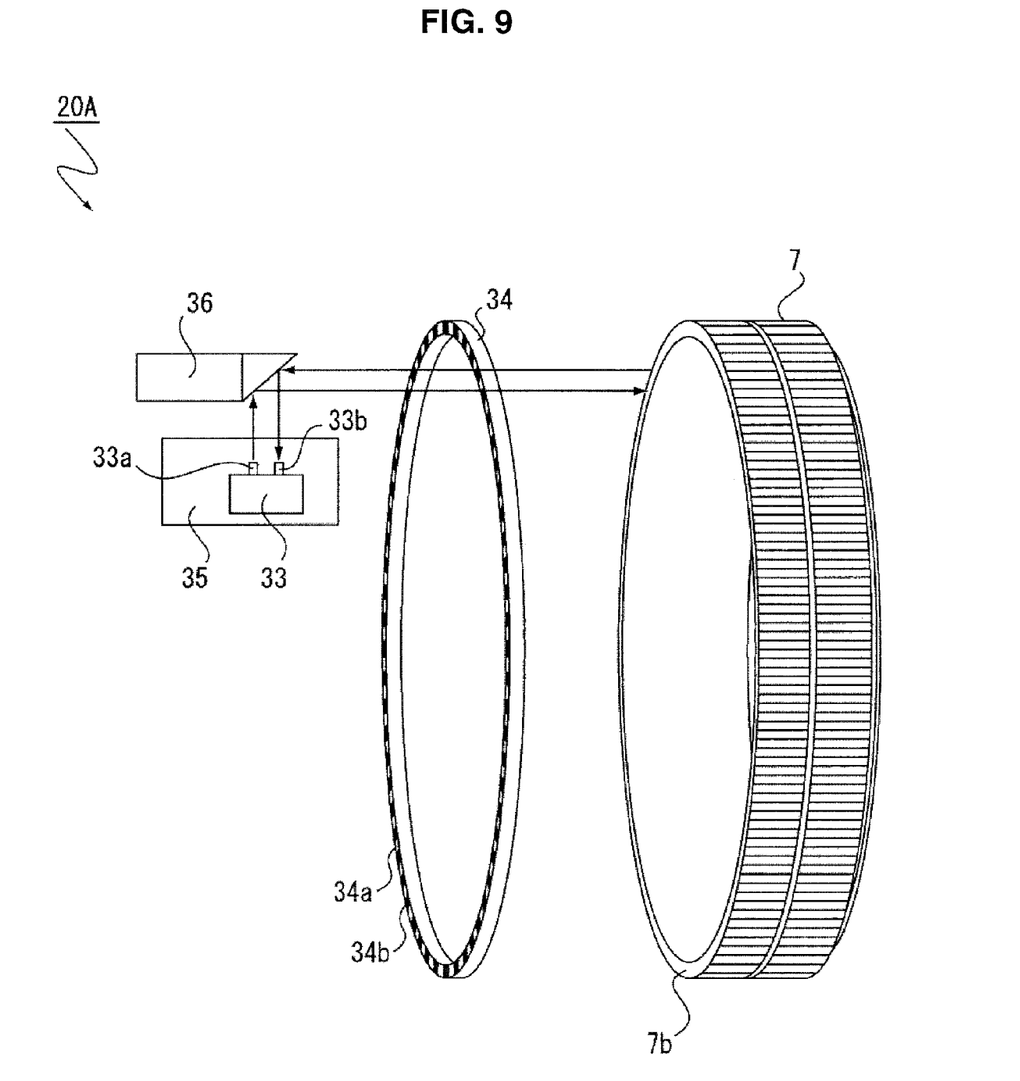
FIG. 9 illustrates a second embodiment.

A position detection device 20A according to a second embodiment will be described with reference to FIG. 9. Components similar to the components already described above will be given the same reference characters, and descriptions of such components will be omitted. In this embodiment, an optical-path changing unit 36 for changing the optical path of light emitted from the photo-reflector 33 or light received by the photo-reflector 33 is added to the first embodiment.

The optical-path changing unit 36 is configured to receive the light emitted from the light emitter 33a of the photo-reflector 33 and to reflect the light so as to change the traveling direction by 90 degrees, thereby causing the light to become incident on a transparent member 34 and the operation ring 7 from a horizontal direction.

Moreover, the optical-path changing unit 36 is also configured to receive the light reflected by a reflective surface 7b of the operation ring 7 and to change the traveling direction by 90 degrees so as to cause the light to travel toward the light receiver 33b of the photo-reflector 33. The optical-path changing unit 36 is preferably disposed on a line extending horizontally from light blocking surfaces 34b or light transmitting surfaces 34a. The optical-path changing unit 36 is formed of a mirror or a prism.

In this embodiment, a side surface of the operation ring 7 serves as the reflective surface 7b. This side surface is located at the side where the optical-path changing unit 36 is disposed.

The transparent member 34 is configured to transmit or block the light emitted from the detection unit 35. In this embodiment, the light blocking surfaces 34b and the light transmitting surfaces 34a are formed on one of side surfaces of the transparent member 34. This side surface is located at the side where the optical-path changing unit 36 is disposed. The transparent member 34 rotates together with the operation ring 7.

The detection unit 35 according to this embodiment is disposed at the side of the transparent member 34 at which the light blocking surfaces 34b and the light transmitting surfaces 34a exist, as well as at the inner side of the optical-path changing unit 36.

With the above-described configuration, the position where the detection unit 35 is disposed is not limited to the position within the transparent member 34, as in the first embodiment, so that the degree of freedom of the position of the detection unit 35 increases. Since the detection unit 35 is not disposed within the transparent member 34, the overall diameter of the lens barrel 3 can be reduced. In other words, size reduction becomes possible.

The overall operation for detecting the movement amount of the operation ring 7 according to this embodiment will be described. Light emitted from the light emitter 33a of the detection unit 35 is reflected by the optical-path changing unit 36 so that the traveling direction is changed by 90 degrees. Then, the light reaches the transparent member 34. The light is blocked by a light blocking surface 34b, but is transmitted through a light transmitting surface 34a and reaches the reflective surface 7b, and the light is reflected by the reflective surface 7b. Then, the light reflected by the reflective surface 7b returns to the optical-path changing unit 36 and is changed in traveling direction by 90 degrees by the optical-path changing unit 36 so as to be reflected toward the detection unit 35. The light is then detected by the light receiver 33b. Thus, by counting, from a specific position, the number of light blocking surfaces 34b that the light has passed, as in the first embodiment, the amount by which the transparent member 34 has moved can be detected. By detecting the movement amount, the rotational position of the operation ring 7 can be detected.

Although the angle by which the optical path is changed by the optical-path changing unit 36 is 90 degrees in this embodiment, the angle is not limited to this angle. The angle by which the optical path is changed by the optical-path changing unit 36 is appropriately changeable in accordance with the position where the detection unit 35 is disposed. However, it is necessary to perform adjustment so that the light becomes incident on the side surface of the transparent member 34 from the horizontal direction.

As described above, according to the present disclosure, the rotation detection accuracy can be improved, and an electrostatic countermeasure effect can be achieved.

In the present embodiment, the distance from the reflective surface 7a to the photo-reflector 33 is longer than the distance from the light blocking surfaces 31b to the photo-reflector 33, and the detection accuracy of the detection unit 35 improves in accordance with the characteristics of the photo-reflector 33.

Furthermore, since the reflective surface 7a is formed on the operation ring 7 that is operated so as to rotate together with the transparent member 31, the operation ring 7a can be readily formed at the outer peripheral side of the light transmitting surfaces 31a and the light blocking surfaces 31b, and a dedicated component for forming the reflective surface 7a is not necessary. A reduced number of components as well as reduced manufacturing cost can be achieved.

Furthermore, since the ring-shaped operation ring 7 is attached to the outer peripheral surface of the transparent member 31, the operation ring 7 and the photo-reflector 31 joined together have a small outer shape, so that the lens barrel 3 can be reduced in size.

Additionally, the present technology may also be configured as below.

(1)

A position detection device including:
a detection unit configured to have a photo-reflector including a light emitter and a light receiver, the light receiver receiving light emitted from the light emitter and reflected by a reflective surface moved in a predetermined direction, the detection unit detecting a movement amount of the reflective surface based on a change in intensity of the received light; and
a transparent member configured to be disposed between the reflective surface and the detection unit and to move together with the reflective surface, the transparent member being provided with a light blocking surface configured to block light and a light transmitting surface configured to transmit light, the light blocking surface and the light transmitting surface being arranged in a moving direction of the reflective surface,
wherein a distance from the reflective surface to the photo-reflector is longer than a distance from the light blocking surface to the photo-reflector.

(2)

The position detection device according to (1),
wherein the light blocking surface and the reflective surface are formed on opposite surfaces of the transparent member.

(3)

The position detection device according to (1) or (2),
wherein a movable section configured to move together with the transparent member is provided, and
wherein the reflective surface is formed at the movable section.

(4)

The position detection device according to any one of (1) to (3),
wherein the transparent member is formed in a ring shape and is rotatable, and
wherein the detection unit is disposed within the transparent member.

(5)

The position detection device according to any of (1) to (4),
wherein a ring-shaped movable section having the reflective surface is provided, and
wherein the movable section is attached to an outer peripheral surface of the transparent member.

(6)

The position detection device according to any of (1) to (5),
wherein the light blocking surface is formed such that a light blocking rate of the light blocking surface changes continuously and linearly in the moving direction of the reflective surface.

(7)

The position detection device according to (6),
wherein the light blocking surface is formed in a triangular shape.

(8)

The position detection device according to any of (1) to (7),
wherein an optical-path changing unit configured to change a traveling direction of the light emitted from the light emitter and a traveling direction of the light received by the light receiver is provided between the photo-reflector and the reflective surface.

(9)

The position detection device according to any of (1) to (8),
wherein the reflective surface is made of metal.

(10)

The position detection device according to any of (1) to (9),
wherein the light blocking surface is formed by printing ink.

(11)

The position detection device according to any of (1) to (9),
wherein the light blocking surface is formed by applying a coating.

(12)

The position detection device according to any of (1) to (9),
wherein the light blocking surface is formed by bonding a seal.

(13)

The position detection device according to any of (1) to (9),
wherein the transparent member is made of resin.

REFERENCE SIGNS LIST 1 imaging apparatus
2 apparatus body
3 lens barrel
4 housing
4a input operation section
4b opening
4c mount section
4d connection terminal
5 imaging element
6 outer barrel
7 operation ring
7a, 7b reflective surface
8 zoom lever
9 mount member
10 first lens group
11 lens support frame
12 reflective surface
30 lens-barrel body
31, 34 transparent member
31a, 34a light transmitting surface
31b, 34b light blocking surface
33 photo-reflector
33a light emitter
33b light receiver
35 detection unit
36 optical-path changing unit

The invention claimed is:

1. A position detection device comprising:
a detection unit configured to have a photo-reflector including a light emitter and a light receiver, the light receiver receiving light emitted from the light emitter and reflected by a reflective surface moved in a predetermined direction, the detection unit detecting a movement amount of the reflective surface based on a change in intensity of the received light; and
a transparent member configured to be disposed between the reflective surface and the detection unit and to move together with the reflective surface, the transparent member being provided with a light blocking surface configured to block light and a light transmitting surface configured to transmit light, the light blocking surface and the light transmitting surface being arranged in a moving direction of the reflective surface,
wherein a distance from the reflective surface to the photo-reflector is longer than a distance from the light blocking surface to the photo-reflector.

2. The position detection device according to claim 1, wherein the light blocking surface and the reflective surface are formed on opposite surfaces of the transparent member.

3. The position detection device according to claim 1, wherein a movable section configured to move together with the transparent member is provided, and
wherein the reflective surface is formed at the movable section.

4. The position detection device according to claim 1, wherein the transparent member is formed in a ring shape and is rotatable, and
wherein the detection unit is disposed within the transparent member.

5. The position detection device according to claim 3, wherein a ring-shaped movable section having the reflective surface is provided, and
wherein the movable section is attached to an outer peripheral surface of the transparent member.

6. The position detection device according to claim 1, wherein the light blocking surface is formed such that a light blocking rate of the light blocking surface changes continuously and linearly in the moving direction of the reflective surface.

7. The position detection device according to claim 6, wherein the light blocking surface is formed in a triangular shape.

8. The position detection device according to claim 1, wherein an optical-path changing unit configured to change a traveling direction of the light emitted from the light emitter and a traveling direction of the light received by the light receiver is provided between the photo-reflector and the reflective surface.

9. The position detection device according to claim 1, wherein the reflective surface is made of metal.

10. The position detection device according to claim 1, wherein the light blocking surface is formed by printing ink.

11. The position detection device according to claim 1, wherein the light blocking surface is formed by applying a coating.

12. The position detection device according to claim 1, wherein the light blocking surface is formed by bonding a seal.

13. The position detection device according to claim 1, wherein the transparent member is made of resin.

14. A lens barrel comprising:
an optical element and a position detection device,
wherein the position detection device includes
a detection unit configured to have a photo-reflector including a light emitter and a light receiver, the light receiver receiving light emitted from the light emitter and reflected by a reflective surface moved in a predetermined direction, the detection unit detecting a movement amount of the reflective surface based on a change in intensity of the received light, and
a transparent member configured to be disposed between the reflective surface and the detection unit and to move together with the reflective surface, the transparent member being provided with a light blocking surface configured to block light and a light transmitting surface configured to transmit light, the light blocking surface and the light transmitting surface being arranged in a moving direction of the reflective surface,
wherein a distance from the reflective surface to the photo-reflector is longer than a distance from the light blocking surface to the photo-reflector.

15. An imaging apparatus comprising:
a lens barrel having an optical element and a position detection device,
wherein the position detection device includes
a detection unit configured to have a photo-reflector including a light emitter and a light receiver, the light receiver receiving light emitted from the light emitter and reflected by a reflective surface moved in a predetermined direction, the detection unit detecting a movement amount of the reflective surface based on a change in intensity of the received light, and
a transparent member configured to be disposed between the reflective surface and the detection unit and to move together with the reflective surface, the transparent member being provided with a light blocking surface configured to block light and a light transmitting surface configured to transmit light, the light blocking surface and the light transmitting surface being arranged in a moving direction of the reflective surface,
wherein a distance from the reflective surface to the photo-reflector is longer than a distance from the light blocking surface to the photo-reflector.

* * * * *